United States Patent [19]
Gilbert

[11] Patent Number: 5,387,856
[45] Date of Patent: Feb. 7, 1995

[54] SPEED CONTROL ARRANGEMENTS FOR ELECTRIC MOTORS

[75] Inventor: David P. Gilbert, Lincoln, England

[73] Assignee: Plessey SemiConductors Limited, United Kingdom

[21] Appl. No.: 139,439

[22] Filed: Oct. 20, 1993

[30] Foreign Application Priority Data

Oct. 26, 1992 [GB] United Kingdom ............... 9222450

[51] Int. Cl.6 ............................................. H02P 5/28
[52] U.S. Cl. ................................... 318/807; 318/811;
318/808; 388/829; 388/912; 388/853
[58] Field of Search ........ 318/254, 138, 439, 771–772,
318/798–803, 739–740, 756, 805–811, 812;
338/804–805, 811–812, 814–815, 828–829, 827,
830–834, 837, 838–841, 842–847, 848–849, 851,
853–855, 912; 310/152

[56] References Cited

U.S. PATENT DOCUMENTS

| | | | |
|---|---|---|---|
| 4,099,108 | 7/1978 | Okawa et al. | 318/808 |
| 4,516,065 | 5/1985 | Ninomiya et al. | 318/811 |
| 4,599,549 | 7/1986 | Mutoh et al. | 318/806 X |
| 5,146,148 | 9/1992 | Voet | 318/803 |
| 5,175,483 | 12/1992 | Fujii et al. | 318/807 |
| 5,179,336 | 1/1993 | Orgovan | 318/758 |

FOREIGN PATENT DOCUMENTS

| | | |
|---|---|---|
| 0241920 | 10/1987 | European Pat. Off. . |
| 2149242 | 6/1985 | United Kingdom . |
| 2154083 | 8/1985 | United Kingdom . |

Primary Examiner—William M. Shoop, Jr.
Assistant Examiner—David Martin
Attorney, Agent, or Firm—Kirschstein, Ottinger, Israel & Schiffmiller

[57] ABSTRACT

In a speed control arrangement for an induction motor or an a.c. permanent magnet motor in which any one of a number of power frequencies may be selected for application to the motor, there is provided circuitry to control the rate of change of frequency from one selected power frequency to another to control the acceleration or deceleration of the motor.

3 Claims, 1 Drawing Sheet

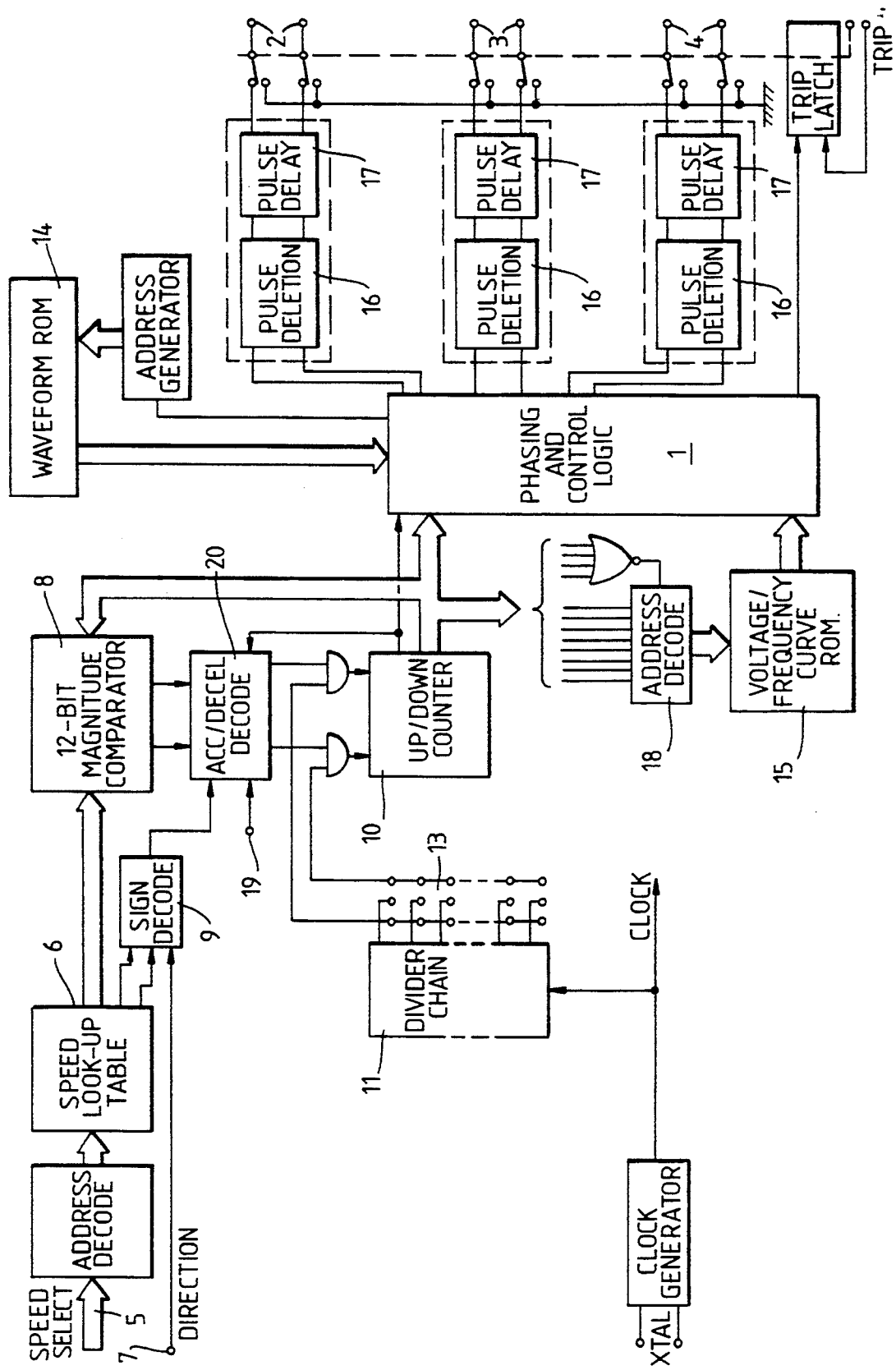

SPEED CONTROL ARRANGEMENTS FOR ELECTRIC MOTORS

BACKGROUND OF THE INVENTION

FIELD OF THE INVENTION

The present invention relates to speed control arrangements for electric motors, and in particular, although not exclusively, to speed control arrangements for induction motors or a.c. permanent magnet motors, in which the speed of the motor is dependent upon the frequency or at least the fundamental frequency component of an energising signal applied to the motor.

SUMMARY OF THE INVENTION

According to one aspect of the present invention, in a speed control arrangement for an electric motor of which the speed of rotation is dependent upon the frequency of a signal applied thereto, in which arrangement any one of a set of predetermined frequencies may be selected for application to said motor, there are provided means to control the rate of change of frequency of the signal applied to said motor when a different frequency is selected.

The signal applied to the motor may be, for example, a pulse-width modulated pulse train generated by said speed control arrangement, said frequency being that of the fundamental component of said pulse-width modulated pulse train.

Preferably the predetermined frequencies are defined by means of a set of respective binary coded numbers stored in a memory of the arrangement, and said means to control the rate of change of frequency of the signal applied to said motor comprises a binary counter which is arranged to count at a predetermined rate towards a selected binary coded number from said set when that number differs from the previously selected number.

According to another aspect of the present invention a speed control arrangement for an electric motor the speed of rotation of which in operation is dependent at least in part on the frequency of an energising signal waveform applied thereto, comprises logic circuit means for generating an energising signal waveform for said motor of a frequency determined by a digitally encoded signal applied to said logic circuit means, storage means for storing a plurality of said digitally encoded signals for determining a plurality of different frequencies, means for selecting a digitally encoded signal from said storage means, and means for determining the rate at which the digitally encoded signal applied to said logic circuit means changes when a different digitally encoded signal is selected from said storage means.

BRIEF DESCRIPTION OF THE DRAWING

A speed control arrangement in accordance with the present invention for controlling induction motors or a.c. permanent magnet electric motors will now be described with reference to the accompanying drawing, which shows a block schematic diagram of the arrangement.

DETAILED DESCRIPTION OF THE PREFERRED EMBODIMENT

Referring to the drawing the arrangement, which may be formed as a single integrated circuit chip, comprises a logic circuit 1 for generating respective pulse-width modulated pulse trains which are provided to three pairs of outputs 2, 3 and 4, the fundamental frequency components of these three pulse trains being of the same frequency but mutually spaced in phase by 120°, as in a conventional three-phase a.c. supply. Each of these pulse trains is utilised to control the conduction state of a respective pair of switching devices, for example hybrid FET/bipolar semiconductor switching devices (not shown), by which positive and negative voltage sources are selectively connected to a respective phase input of an electric motor to be energised.

The fundamental frequency component of the pulse-width modulated pulse trains, which may be termed the "power frequency", may be varied, to vary the speed of rotation of the electric motor, between any of, say, sixteen preselected values in either direction in response to an input signal applied by way of a speed select input path 5. The preselected values may be represented by fourteen-bit numbers stored in a read-only memory 6, the respective addresses of these numbers in the memory 6 being selectable by respective speed select input signals on the path 5. Of the fourteen bits at each address twelve bits represent the selected scalar speed of rotation effectively as a fraction of the maximum speed (represented by all "ones"), while the value of thirteenth bit dictates whether the "aiming" direction of rotation of the electric motor is to be determined internally by the value of the fourteenth bit or externally by way of a one-bit value presented on a path 7.

The twelve speed of rotation bits from a selected address in the memory 6 are applied to one input of a twelve-bit magnitude comparator 8, while the two speed of direction bits are decoded at 9 to provide an indication of the "aiming" direction of rotation, that is, the direction in which the electric motor is next required to rotate, whether it is to be in the same direction as the motor is now running or the reverse. In the comparator 8 the selected twelve speed of rotation bits are compared with a twelve-bit output from a thirteen-bit up/down counter 10, which twelve-bit output is also applied to the logic circuit 1 to set the frequency of the fundamental component of the pulse-width modulated pulse trains. The thirteenth bit of the counter 10, which indicates the existing instantaneous direction of rotation, determines the sequency of the three phase outputs.

If the selected "aiming" direction of rotation is the same as the existing direction, the acceleration or deceleration called for by any difference in the selected speed of rotation and the existing speed is effected by counting up or down respectively the twelve-bit value in the counter 10, by means of pulses from a divider chain 11 driven from a crystal controlled clock pulse generator 12, until it matches the selected twelve bits from the memory 6. The acceleration and deceleration rates of counting are separately selectable by means of a set of links 13, and need not be the same.

If the selected "aiming" direction of rotation is the opposite to the existing direction, the value in the counter 10 has to be counted down to zero, to bring the motor to rest, and then counted up to the required speed in the opposite direction.

A read-only memory 14 is arranged to store digitised sample values representing one quarter cycle of a sinusoidal or near-sinusoidal waveform, these sample values being read out in turn and in the required order, at a rate determined by the twelve-bit output from the counter 10, to generate a stepped waveform at the required fundamental frequency, this waveform being asynchronously double-edge sampled in known manner to derive the pulse-width modulated pulse trains to be supplied to the outputs 2, 3 and 4. The memory 14 may hold, for example, 384 8-bit amplitude values.

Differing motor/load characteristics are allowed for by providing a further memory 15 storing a voltage/frequency profile, the twelve-bit instantaneous frequency output from the counter 10 being decoded to read from the memory 15 a value for the amplitude of the stepped waveform appropriate to that frequency for the particular motor/load combination. The voltage/frequency profile may consist of three different areas, voltage boosting at lower frequencies, proportional to frequency over middle range frequencies and constant voltage at the upper end of the frequency range. In view of the wide frequency range of which the arrangement is capable, the output of the counter 10 may be applied to the address decoder 18 by way of metallisation links (not shown) to ensure the best possible voltage/frequency resolution irrespective of the chosen frequency range.

The minimum width of pulse in the pulse width modulated pulse trains delivered to the outputs 2, 3 and 4 may be defined in respective circuits 16, in which shorter pulses are deleted, while the delay time between switching of the complementary outputs used to control the pairs of devices (not shown) for each phase may be defined in respective delay circuits 17.

By means of a "hold" signal on an input 19 to the accelerate/decelerate decoder 20, any acceleration or deceleration may be prevented, for example to prevent excessive deceleration rates from dumping too much power into into the switching circuitry and causing a potentially damaging over-voltage condition. The "hold" condition may be initiated, for example, if the d.c. supply voltage to the switching circuitry rises above a predetermined level.

Similarly, a "decelerate" signal may be applied to the input 19 to decelerate the motor to rest, irrespective of the selected state, if it becomes necessary to prevent any overcurrent/overheating situation at the switching devices.

I claim:

1. A speed control arrangement for an electric motor, comprising: logic circuit means for generating an energizing signal waveform for said motor of a frequency determined by a control signal applied to said logic circuit means; storage means for storing a plurality of first digitally encoded values each for determining a respective predetermined speed of rotation of said motor; means for selecting a first digitally encoded value from said plurality of first digitally encoded values stored in said storage means; counter means for holding a second digitally encoded value; means for applying a signal derived from said second digitally encoded value to said logic circuit means as said control signal; means responsive to a difference between said selected first digitally encoded value and said second digitally encoded value for changing said second digitally encoded value towards said selected first digitally encoded value at a predetermined rate; and means for selecting said predetermined rate at which said second digitally encoded value is changed.

2. A speed control arrangement for an electric motor in accordance with claim 1, wherein said counter means comprises an up/down counter, and said means responsive to a difference between said selected first digitally encoded value and said second digitally encoded value for changing said second digitally encoded value is arranged to count the value held by said counter means selectively up or down towards said selected first digitally encoded value.

3. A speed control arrangement for an electric motor in accordance with claim 1, wherein said energizing signal waveform comprises a train of width-modulated pulses, the width of said pulses being modulated so as to vary cyclically at said frequency.

* * * * *